Oct. 26, 1954  C. S. GARLAND  2,692,685
FILTER
Filed July 29, 1952
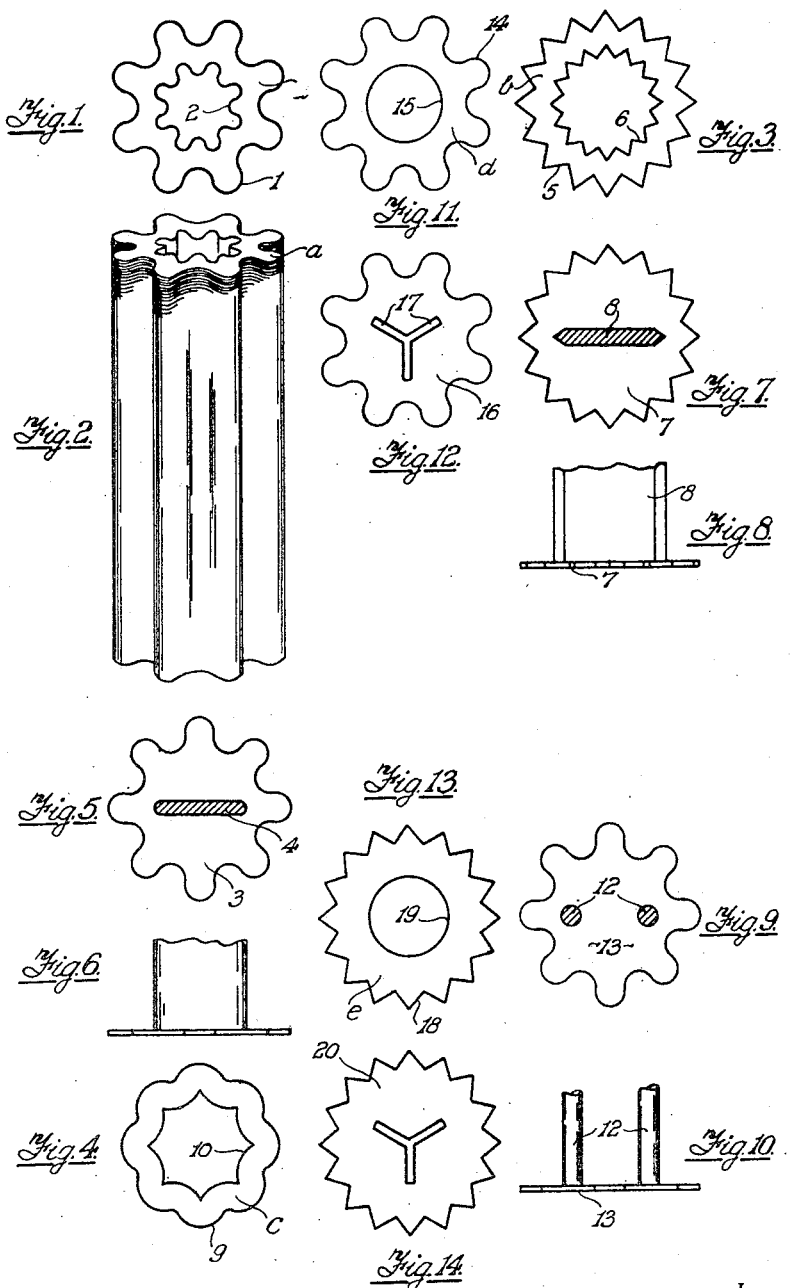
Inventor
Charles Samuel Garland
By
Attorneys.

Patented Oct. 26, 1954

2,692,685

UNITED STATES PATENT OFFICE 2,692,685

FILTER

Charles Samuel Garland, London, England

Application July 29, 1952, Serial No. 301,536

Claims priority, application Great Britain January 1, 1952

3 Claims. (Cl. 210—169)

This invention relates to filter elements for use in filters of the edge filtration type wherein a pile of the said elements in the form of washers or annuli made of cellulosic or other suitable material are assembled in coincident relationship about a central passage, axial compression being applied to the pile of the said filter elements to ensure that the spaces between adjacent elements in the pile are suitable for the degree of filtration desired. In filters of this type the liquid to be filtered normally passes from the outside to the inside of the pile of filter elements, which are secured in alignment by means of a central foraminous support, such as a perforated tube or a radially armed spacer. The central passage is closed at one end by an impermeable disc, conveniently secured to one end of the central support, the other end of the support extending through an annulus of impermeable material into the part of the filter in which the filtrate is received. The matter separated from the liquid to be filtered accumulates on the exterior of the pile of elements and is periodically removed, for example by back-flushing.

In filters employing filter elements of the kind above referred to the rate of filtration is directly dependent upon the external area of the outer surface of the filter elements, the distance travelled by the liquid to be filtered from the outside to the inside of each element and the cross sectional area of the central perforation therein. It is desirable when filtering some contaminated liquids with such filters to ensure that the direct path from the exterior to the interior of each element shall be as uniform as possible otherwise a tendency to selective filtration may result, the liquid to be filtered naturally taking the path which provides the least resistance to fluid flow and on reversal of the flow with clean liquid or with air for cleaning this also follows the path of least resistance and those places where, through a high rate of filtration, a heavier layer of sediment has been built up are not cleaned efficiently if at all.

The invention aims at providing a filter element, for use in filters of the kind referred to, which without occupying more space within the filter will have an external surface area greater than that in filter elements hitherto employed.

The invention also aims at providing a filter element assembly in which the path for filtration between adjacent elements will be substantially uniform across every part of a filter element.

A further object of the invention is to provide means for positively securing the filter elements in a filtering assembly against relative movement.

According to the invention there is provided a filter element of the kind referred to wherein the outer edge of the element is of undulate and/or serrated contour when viewed in plan.

According to a further feature of the invention the inner edge of the filter element is formed with an undulate and/or corrugated contour similar to that at the outer edge thereof.

The invention further provides for the inner and outer edge of a filter element being formed of undulate and/or serrated contour in such a way that the shortest distance between every point on the inner or outer edge and the outer or inner edge thereof respectively is constant or substantially constant.

Reference will now be made to the accompanying drawings which illustrate by way of example various embodiments of the invention and in which:

Fig. 1 is a plan view of one form of construction of a filter element,

Fig. 2 is a perspective view showing an assembled pile of the filter elements according to Fig. 1, Fig. 3 is a second form of construction of a filter element, Fig. 4 is a third form of construction of a filter element, Fig. 5 is a plan of a metal support for one end of a pile of the filter elements shown in Fig. 1, Fig. 6 is an elevation of Fig. 5, Fig. 7 is a plan of a metal support for one end of a pile of filter elements as shown in Fig. 3, Fig. 8 is an elevation of Fig. 7, Fig. 9 is a plan of another form of a metal support for a pile of filter elements according to Fig. 1, Fig. 10 is an elevation of Fig. 9, Fig. 11 is a plan view of a filter element with corrugations on the outer edge only, Fig. 12 is a plan of a metal support for filter elements of the kind shown in Fig. 11, Fig. 13 is a plan of another form of filter element with serrations at the outer edge only, and Fig. 14 is a plan of a metal support for filter elements of the kind shown in Fig. 13.

The filter element a shown in Fig. 1 is formed with a series of undulations 1 along its outer periphery and with a corresponding series of undulations 2 along its inner periphery. It will be seen from a consideration of this figure that the outer periphery of such an element is of considerably greater length than that of a similar annular element of the same diameter.

The arrangement of such filter elements to form a pile in which the adjacent elements are registered in coincident relationship is shown in Fig. 2. In order to retain the pile of elements in such position whilst axial pressure is applied thereto the filter elements are mounted on a support member one form of construction of which is shown in Figs. 5 and 6. The support member consists of a metal base plate 3 having secured thereto by welding or like means a vertically disposed metal strip 4 the opposite edges of which are rounded as shown, the strip 4 being of such a size that the rounded edges thereof fit accurately into two diametrically opposed convolutions 2 on the inner periphery of each of the filter elements a shown in Figs. 1 and 2. When supported in this manner the filter elements are accurately registered in coincident relationship and axial pressure can be applied to the assembly of filter elements without the danger of relative movement of the elements or distortion at the edges or elsewhere.

In Fig. 3 the outer periphery of the filter element b is formed with serrations 5 and the inner periphery is formed with a corresponding series of serrations 6. It will be seen that in this form also the outer periphery of the filter element will be considerably greater in length than that of an annular filter element of the same diameter. The support for an assembly of filter elements of the kind shown in Fig. 3 is illustrated in Figs. 7 and 8, the base plate 7 of the support being serrated in the same way as the outer periphery of the elements shown in Fig. 3 and the vertical metal strip 8 being formed with V-shaped edges so that the strip will fit accurately between diametrically opposed serrations at the inner peripheries of the filter elements.

The form of construction of the filter element C shown in Fig. 4 is one which will provide an exactly constant path for fluid flow over the whole of the surface of the element, the outer periphery of the element being formed with a series of convolutions 9 and the inner periphery being formed with a corresponding number of arcuate serrations 10, the arrangement being such that the minimum distance from every point on the outer periphery of the element to the inner periphery thereof is constant. It will be readily seen that a support member with a vertical strip similar to that shown in Figs. 7 and 8 and with a base plate shaped in the same way as the outer periphery of the element shown in Fig. 4 will support a series of such elements made into a pile and will secure them against relative rotation.

Figs. 9 and 10 show another form of construction of a support member for filter elements of the kind shown in Fig. 1. The support member comprises two vertical rods or tubes 12 which are secured to a base plate 13 shaped to correspond to the outer periphery of the element. In this form of construction it will be obvious that a smaller amount of the inner drainage channel of the assembly of filter elements is occupied by the rods of the support member than is the case where the support member is a solid strip for example. This form of construction of the support member can also be employed with the elements shown in Figs. 3 and 4, the rods or tubes being made of appropriate section, and the base plate being shaped correspondingly to the filter elements.

Fig. 11 shows a filter element d similar to that shown in Fig. 1, but with the outer edge 14 only of undulate contour, the inner edge 15 being circular. A metal support member for such elements is shown in Fig. 12 and consists of a base plate 16, having an external contour the same as the element d, on which is secured perpendicularly thereto a support formed with three radial strips 17 which will ensure that a pile of the elements d will be maintained in coaxial alignment when mounted on the support member.

The filter element e shown in Fig. 13 is similar to that in Fig. 11 but has its outer edge 18 only formed with a serrated contour the inner edge 19 being circular. The support member for this form of filter element is likewise similar to that shown in Fig. 12, but has a base plate 20 with a serrated edge.

I claim:

1. An edge filter comprising a pile of axially compressed annular filter elements composed of cellulosic material and apertured axially to form an outlet passage through the filter and having opposed contacting surfaces for flow of fluid for filtration therebetween, each of said filter elements having circumferentially spaced series of recesses and intervening unrecessed portions around its outer and inner edges, the recesses in the outer edges of the filter elements being alined radially with the unrecessed portions of the inner edges of the respective elements and providing paths of substantially equal length for the flow of fluid across the opposed surfaces of the filter elements between the outer and inner edges thereof, said filter elements being of the same size and configuration, and the recessed and unrecessed portions respectively being registered.

2. An edge filter as defined in claim 1, wherein said recesses form an external periphery of undulate contour on each of the filter elements.

3. An edge filter as defined in claim 1, wherein said recesses form an external periphery of serrated contour on each of the filter elements.

References Cited in the file of this patent

UNITED STATES PATENTS

| Number | Name | Date |
| --- | --- | --- |
| 1,793,583 | Bowden | Feb. 24, 1931 |
| 2,032,828 | Attwood | Mar. 3, 1936 |
| 2,459,318 | Hallinan | Jan. 18, 1949 |
| 2,521,060 | Hallinan | Sept. 5, 1950 |
| 2,547,941 | Heftler | Apr. 10, 1951 |
| 2,554,016 | Czarnecki et al. | May 22, 1951 |